US 8,572,365 B2

(12) United States Patent
Fujimoto et al.

(10) Patent No.: US 8,572,365 B2
(45) Date of Patent: Oct. 29, 2013

(54) INFORMATION GATHERING SYSTEM, TERMINAL UNIT, PROGRAM FOR INFORMATION GATHERING, AND PROGRAM FOR A TERMINAL

(75) Inventors: Shinichi Fujimoto, Tokyo (JP); Hiroko Higuma, Tokyo (JP); Ai Enomoto, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 766 days.

(21) Appl. No.: 12/619,737

(22) Filed: Nov. 17, 2009

(65) Prior Publication Data

US 2010/0211774 A1    Aug. 19, 2010

(30) Foreign Application Priority Data

Feb. 13, 2009    (JP) .................................. 2009-031140

(51) Int. Cl.
*H04L 29/06* (2006.01)

(52) U.S. Cl.
USPC ............. 713/150; 713/189; 726/22; 709/206

(58) Field of Classification Search
USPC ...................... 713/150, 189; 726/22; 709/206
See application file for complete search history.

(56) References Cited

U.S. PATENT DOCUMENTS

| | | | |
|---|---|---|---|
| 7,054,905 B1 * | 5/2006 | Hanna et al. ................... | 709/206 |
| 7,296,010 B2 * | 11/2007 | Haase ..................................... | 1/1 |
| 7,376,833 B2 * | 5/2008 | Sako et al. ..................... | 713/168 |
| 7,483,838 B1 * | 1/2009 | Marks ................................ | 705/2 |
| 2001/0039507 A1 * | 11/2001 | Yagihashi et al. ............... | 705/10 |
| 2002/0024684 A1 * | 2/2002 | Tanimoto ...................... | 358/400 |
| 2002/0035486 A1 * | 3/2002 | Huyn et al. ........................ | 705/3 |
| 2002/0143885 A1 * | 10/2002 | Ross, Jr. ........................ | 709/207 |
| 2003/0065727 A1 * | 4/2003 | Clarke et al. ................... | 709/206 |
| 2003/0088556 A1 * | 5/2003 | Allen, III ........................... | 707/3 |
| 2004/0019780 A1 * | 1/2004 | Waugh et al. .................. | 713/152 |
| 2004/0210472 A1 * | 10/2004 | Lew et al. ....................... | 705/10 |
| 2005/0102499 A1 | 5/2005 | Kosuga et al. | |
| 2005/0125279 A1 * | 6/2005 | Wu .................................. | 705/10 |
| 2005/0240478 A1 * | 10/2005 | Lubow et al. .................... | 705/14 |
| 2006/0075046 A1 * | 4/2006 | Yozell-Epstein et al. ..... | 709/206 |

(Continued)

FOREIGN PATENT DOCUMENTS

| | | | |
|---|---|---|---|
| JP | 6-112970 A | 4/1994 | |
| JP | 10-63590 A | 3/1998 | |

(Continued)

OTHER PUBLICATIONS

Korean Patent Office; "Decision of Rejection" in Korean Patent Application No. 10-2010-0001126, (Apr. 26, 2012).

(Continued)

*Primary Examiner* — Nathan Flynn
*Assistant Examiner* — Sarah Su
(74) *Attorney, Agent, or Firm* — Leydig, Voit & Mayer, Ltd.

(57) ABSTRACT

A host computer adds a keycode to e-mail and a terminal unit leads an information gathering candidate to add reply information to the e-mail. When the host computer receives the e-mail to which reply information has been added, the host computer stores the reply information in one of data storage areas having a memory address corresponding to a memory address associated the keycode of the e-mail.

6 Claims, 11 Drawing Sheets

(56) References Cited

U.S. PATENT DOCUMENTS

| | | | |
|---|---|---|---|
| 2006/0265265 A1* | 11/2006 | Wolfe et al. | 705/8 |
| 2007/0101139 A1* | 5/2007 | Bayer et al. | 713/168 |
| 2008/0296370 A1* | 12/2008 | Khandelwal et al. | 235/380 |
| 2009/0009489 A1* | 1/2009 | Lee | 345/179 |
| 2009/0055221 A1* | 2/2009 | Loftus et al. | 705/3 |
| 2009/0178144 A1* | 7/2009 | Redlich et al. | 726/27 |
| 2009/0228345 A1* | 9/2009 | Ford et al. | 705/10 |
| 2009/0265180 A1* | 10/2009 | Ellison et al. | 705/1 |
| 2010/0309505 A1* | 12/2010 | Partridge et al. | 358/1.15 |
| 2010/0318621 A1* | 12/2010 | Aono et al. | 709/206 |
| 2011/0074670 A1* | 3/2011 | Teegan et al. | 345/156 |
| 2011/0173438 A1* | 7/2011 | Matzkel | 713/150 |
| 2012/0296823 A1* | 11/2012 | Pousti | 705/44 |

FOREIGN PATENT DOCUMENTS

| | | |
|---|---|---|
| JP | 10-154182 A | 6/1998 |
| JP | 11-143856 A | 5/1999 |
| JP | 2001-249914 A | 9/2001 |
| JP | 2003-115011 A | 4/2003 |
| JP | 2004-272660 A | 9/2004 |
| JP | 2005-31958 A | 2/2005 |
| JP | 2005-101883 A | 4/2005 |
| JP | 2005-285111 A | 10/2005 |
| JP | 2005-353019 A | 12/2005 |
| JP | 2006-235734 A | 9/2006 |
| JP | 2008-123049 A | 5/2008 |
| KR | 2001-0108714 A | 12/2001 |
| KR | 10-2008-0077525 A | 8/2008 |
| WO | WO 02/03232 A2 | 1/2002 |

OTHER PUBLICATIONS

Korean Patent Office; "Decision of Rejection" in Korean Patent Application No. 10-2010-0001126, (Jan. 11, 2012).

State Intellectual Property Office of the People's Republic of China; "Office Action", in Chinese Patent Application No. 2010100029995, (Jan. 30, 2012).

Japanese Patent Office; Office Action in Japanese Patent Application No. 2009-031140 (Oct. 23, 2012).

* cited by examiner

INFORMATION GATHERING SYSTEM, TERMINAL UNIT, PROGRAM FOR INFORMATION GATHERING, AND PROGRAM FOR A TERMINAL

BACKGROUND OF THE INVENTION

1. Field of the Invention

The present invention relates to an information gathering system, a terminal unit, program for information gathering, and program for a terminal.

2. Background Art

A system that performs a survey (questionnaires) by sending electronic data such as E-mail to information gathering candidates through a network is disclosed in JP 11-143856 A. In the above-mentioned conventional system, the input form of a reply of a questionnaire is restricted to the prescribed form which is prescribed by the person conducting the survey. Thereby, it can be easily achieved to automate the database taking-in work of reply results.

Other prior arts are disclosed in, for example, JP 10-63590 A, JP 2005-101883 A, JP 10-154182 A, JP 2005-285111 A, JP 2005-353019 A, JP 2003-115011 A, JP 2001-249914 A, JP 2004-272660 A, JP 2004-503013 A, JP 2005-31958 A.

If there is disagreement in correspondence between an information gathering candidate and collected information (that is, reply), accuracy of the information gathering may decrease and the result of the information gathering may need to be handled as inaccurate information. Therefore, in the process of information gathering, it is required that the correspondence between the reply and an information gathering candidate is secured. Besides, it is desirable to avoid taking too much time and effort for arrangement and storing of the collected information. In particular, the more there are many candidates of information gathering, the more the number of the acquired information (namely, amount of reply data) proportionally increases. For this reason, it is acquired to perform arrangement and storing of the received information efficiently.

SUMMARY OF THE INVENTION

It is, therefore, an object of the present invention to provide an information gathering system, a terminal unit, program for information gathering, and program for a terminal, which can gather information efficiently while surely keeping correspondence of a reply and an information gathering candidate.

Other and further objects, features and advantages of the invention will appear more fully from the following description.

According to a first aspect of the present invention, an information gathering system includes a host unit and a terminal unit. The host unit is in connection with a network and includes a memory unit. The memory unit has a plurality of data storage areas. Each of the plurality of the data storage areas is respectively associated with each of a plurality of memory addresses. The terminal unit is in connection with the network. The host unit creates specific data. The specific data includes reply requesting information and one or more sorts of identification information. The identification information is associated with one of the plurality of memory addresses in accordance with a predetermined correspondence rule. The reply requesting information is information for requesting a reply of an information gathering candidate. The terminal unit receives the specific data from the network and displays the reply requesting information on the terminal unit in a state where reply information can be added to the specific data. The host unit receives the specific data including the reply information from the network. The host unit stores the reply information included in the received specific data into one of the plurality of the data storage areas so that a memory address of the one of the plurality of the data storage areas corresponds to a memory address associated with the identification information of the received specific data.

According to a second aspect of the present invention, an information gathering system includes a host unit and a terminal unit. The host unit is in connection with a network and including a memory unit. The memory unit has a plurality of data storage areas. Each of the plurality of the data storage areas is respectively associated with each of a plurality of memory addresses. The terminal unit is in connection with the network. The host unit creates specific data. The specific data includes one or more sorts of identification information. The identification information is associated with one of the plurality of memory addresses in accordance with a predetermined correspondence rule. The terminal unit receives the specific data from the network. The terminal unit causes a printer to print an information printed material so that the identification information included in the specific data is printed on the information printed material. The host unit reads the information printed material on which the identification information is printed. The host unit converts the identification information printed on the information printed material and a written information written in a predetermined position of the information printed material into data. The host unit stores the data of the written information into one of the plurality of the data storage areas as a reply of an information gathering candidate so that a memory address of the one of the plurality of the data storage areas corresponds to a memory address associated with the identification information printed on the information printed material.

According to a third aspect of the present invention, a terminal unit includes a monitor, display means and sending means. The display means displays reply requesting information on the monitor upon the terminal unit receiving specific data that is encrypted and includes the reply requesting information and one or more sorts of identification information. The display means displays the reply requesting information in a state where the specific data is decrypted and reply information of an information gathering candidate can be added to the specific data. The identification information is associated with one of a plurality of memory addresses of a plurality of data storage areas of a host unit in accordance with a predetermined correspondence rule. The reply requesting information is information for requesting a reply of the information gathering candidate. The sending means sends the host unit the specific data that is encrypted and the reply information added to. Modification of the identification information is forbidden at least in a period from a time at which the specific data is decrypted to a time at which the decrypted specific data is encrypted again.

According to a fourth aspect of the present invention, a terminal unit includes a monitor, display means, encrypting means and sending means. The display means displays reply requesting information on the monitor upon the terminal unit receiving specific data that is encrypted and includes the reply requesting information and one or more sorts of identification information. The display means displays the reply requesting information in a state where the specific data is decrypted and reply information of an information gathering candidate can be added to the specific data. The identification information is associated with one of a plurality of memory addresses of a plurality of data storage areas of a host unit in accordance with a predetermined correspondence rule. The reply requesting information is information for requesting a reply of the information gathering candidate. The encrypting means encrypts the specific data whose reply requesting information is displayed on the monitor immediately after closing the display of the reply requesting information of the specific data upon the terminal unit receiving a command to close the displayed image of the reply information of the specific data to which the reply information is added. The sending means sends the host unit the specific data encrypted by the encrypting means.

According to a fifth aspect of the present invention, an information gathering program for causing a host unit and a terminal unit to gather information, the host unit being in connection with a network and including a memory unit, the memory unit having a plurality of data storage areas, each of the plurality of the data storage areas being respectively associated with each of a plurality of memory addresses the terminal unit being in connection with the network, the program including:

means for causing the host unit to create specific data including reply requesting information and one or more sorts of identification information, the identification information being associated with one of the plurality of memory addresses in accordance with a predetermined correspondence rule, the reply requesting information being information for requesting a reply of an information gathering candidate;

means for causing the terminal unit to receive the specific data from the network and to display the reply requesting information on the terminal unit in a state where reply information can be added to the specific data; and means for causing the host unit to store the reply information in the specific data which the host unit receives from the network into one of the plurality of the data storage areas so that a memory address of the one of the plurality of the data storage areas corresponds to a memory address associated with the identification information of the received specific data.

According to a sixth aspect of the present invention, a program for a terminal unit including:

means for causing the terminal unit to display reply requesting information on a monitor of the terminal unit upon the terminal unit receiving specific data, the specific data being encrypted and including the reply requesting information and one or more sorts of identification information, the identification information being associated with one of a plurality of memory addresses of a plurality of data storage areas of a host unit in accordance with a predetermined correspondence rule, the reply requesting information being information for requesting a reply of an information gathering candidate, the reply requesting information being displayed by the means in a state where the specific data is decrypted and reply information of the information gathering candidate can be added to the specific data; and means for causing the terminal unit to forbid modification of the identification information at least in a period from a time at which the specific data is decrypted to a time at which the decrypted specific data is encrypted again.

According to a seventh aspect of the present invention, a program for a terminal unit including:

means for causing the terminal unit to display reply requesting information on a monitor of the terminal unit upon the terminal unit receiving specific data, the specific data being encrypted and including the reply requesting information and one or more sorts of identification information, the identification information being associated with one of a plurality of memory addresses of a plurality of data storage areas of a host unit in accordance with a predetermined correspondence rule, the reply requesting information being information for requesting a reply of an information gathering candidate, the reply requesting information being displayed by the means in a state where the specific data is decrypted and reply information of the information gathering candidate can be added to the specific data; and means for causing the terminal unit to end displaying of the reply requesting information of the specific data upon the terminal unit receiving a command to close the displayed image of the reply information of the specific data to which the reply information is added, the means causing the terminal unit to encrypt the specific data immediately after the end of displaying of the reply requesting information.

The features and advantages of the present invention may be summarized as follows.

According to the first aspect of the present invention, a host unit adds identification information to specific data and a terminal unit leads an information gathering candidate to add reply information to the specific data. Further, when the host unit receives the specific data to which reply information added, the host unit can store the reply information into one of data storage areas whose memory address corresponds to the identification information of the specific data. Since each specific data has identification information individually, confusion can be suppressed in data management even if the number of information gathering candidates is large. Further, since a correspondence rule of the identification information and memory addresses of the data storage areas is orderly determined before the host unit creates each specific data, the host unit can perform data storing appropriately with small computation load when the host unit receives the specific data. Thereby, information gathering can be achieved with high efficiency while securing the accurate correspondence of each reply and each information gathering candidates.

According to the second aspect of the present invention, the information gathering system can perform information gathering with high efficiency even if information to be gathered includes a particular type of information having a difficulty to be gathered as digital data such as a signature or a seal.

According to the third aspect of the present invention, in a case where the terminal unit receives an encrypted specific data, modification of identification information in the specific data is forbidden at least in a period in which the specific data is decrypted and exists as non-encrypted data in the terminal unit. Thereby, the identification information being included in each of the specific data individually, which can specify the operator of the terminal unit, can be protected while adding reply information to the specific data is permitted. This makes it possible to lead the information gathering candidates to add their replies to each specific data and to suppress falsification in information gathering as much as possible. Furthermore, since the terminal unit sends a host unit the specific data to which reply information added, the host unit can store the reply information into its data storage area whose address corresponds to the identification information of the specific data. As described above, the terminal unit according to the third aspect makes it possible to perform information gathering with high efficiency while keeping the correspondence of each reply and each information gathering candidate.

According to the fourth aspect of the present invention, when an operator of the terminal unit ends the operation after the operator adds reply information to the specific data, the specific data can be automatically encrypted by the terminal unit. That is, correspondence of the operator and the reply information can be protected when the operation to the specific data is finished. Thereby, the specific data to which reply information added can be encrypted and be sent while keeping the correspondence of the operator and the reply information. Furthermore, since the terminal unit sends a host unit the specific data to which reply information added, the host unit can store the reply information into its data storage area whose address corresponds to the identification information of the specific data. As described above, the terminal unit according to the fourth aspect makes it possible to perform information gathering with high efficiency while keeping correspondence of each reply and each information gathering candidate.

According to the fifth aspect of the present invention, an information gathering program to achieve the first aspect can be obtained.

According to the sixth aspect of the present invention, a program for a terminal unit to achieve the third aspect can be obtained.

According to the seventh aspect of the present invention, a program for a terminal unit to achieve the fourth aspect can be obtained.

DETAILED DESCRIPTION OF THE PREFERRED EMBODIMENTS

First Embodiment

Figure 1:
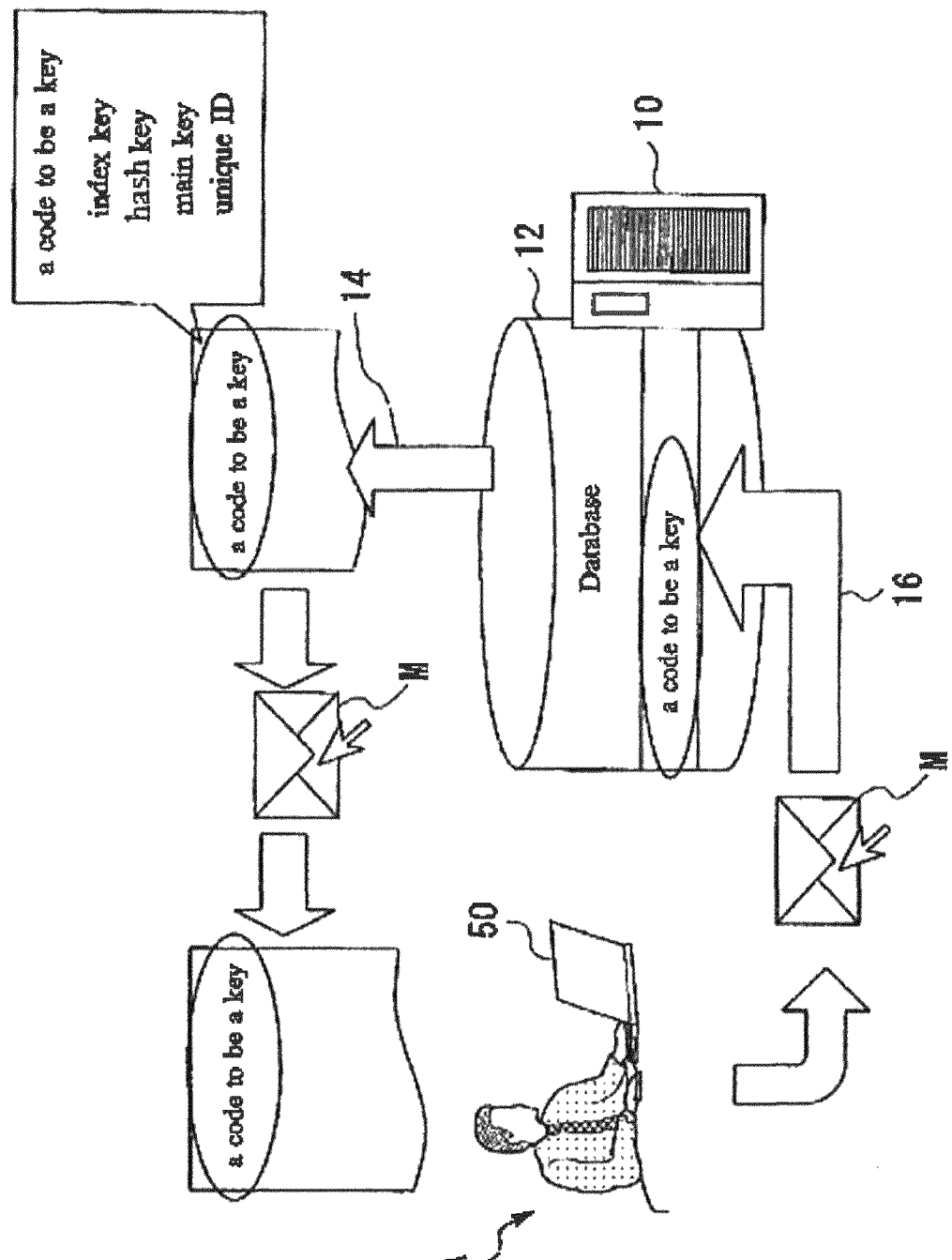
FIG. 1 is a diagram showing the configuration of an information gathering system according to the first embodiment of the present invention.

FIG. 1 is a diagram showing the configuration of an information gathering system according to a first embodiment. The information gathering system according to the first embodiment performs an information gathering by using e-mail. Specifically, questionnaire is performed in the first embodiment. E-mail is sent to each information gathering candidate, then each information gathering candidate writes the reply in the e-mail.

The information gathering system according to the first embodiment includes a host computer 10. The host computer 10 has a memory unit and database program for storing data to the memory unit. For convenience, the memory unit and the database program are simply depicted as a database 12 in the figure. The database 12 enables data search or data sampling of stored data easily, thereby data reuse can be achieved. The host computer 12 is connected to a network (not shown). The network being connected to the host computer 12 may be several types of communication line such as internet, intranet, or Local Area Network (LAN).

The host computer 10 includes an e-mail creating program 14 and can execute it. For convenience, the e-mail creating program 14 is shown in FIG. 1 as an arrowed line. The e-mail creating program 14 is installed to create e-mail (referred to as "e-mail M" in FIG. 1). When the e-mail creating program 14 creates the e-mail M, the e-mail creating program 14 adds to the e-mail M a particular code that is used as a key. Hereinafter, the particular code is referred to as "keycode". The keycode serves as identification information to distinguish each e-mail M in case where a plurality of e-mails M is sent to the network. For example, index key, hash key, main key or unique ID may be used as the keycode. Destination e-mail address or return e-mail address (for example, the host computer has a plurality of e-mail address) also may be used as the keycode. Storage addresses of the database 12 and the keycodes are associated each other in accordance with a predetermined correspondence rule which is determined beforehand.

The e-mail M is delivered to a terminal unit 50 of the information gathering candidate A through the network (not shown). The terminal unit 50 may be a desk top personal computer, a notebook computer, or a mobile computing device such as Personal Digital Assistant. The information gathering candidate A opens the e-mail M on the terminal unit 50, then the information gathering candidate A reads the question (questionnaire) written in the e-mail M. The information gathering candidate A sends the e-mail M to the host computer 10 after writing the reply to the question.

The host computer 10 receives the e-mail M from the network (not shown). The host computer 10 can execute a data storage program 16. The data storage program 16 opens the e-mail M and read the keycode of the e-mail M. Next, the data storage program 16 stores reply information in the e-mail M into a data storage area of the database 12 so that the memory address of the data storage area is equal to memory address associated to the keycode of the e-mail M. For convenience, the data storage program 16 is shown as an arrowed line in FIG. 1.

As described above, according to the first embodiment, the host computer 10 adds keycode to the e-mail M, and the terminal unit 50 leads the information gathering candidate A to add reply information to the e-mail M.

Further, when the host computer 10 receives the e-mail M that includes reply information of the information gathering candidate A, the reply information can be stored into one of data storage areas whose memory address corresponds to the received keycode.

According to the first embodiment, these sequential processes can be automatically achieved by the host computer 10. Hence, it is possible to send questionnaires and to receive replies by the host computer 10 automatically.

Each e-mail M has individual keycode. Therefore, confusion in data management can be suppressed even if the number of e-mail M is large. Further, since the correspondence rule of the keycode and addresses is orderly determined before the host computer 10 creates each e-mail M, the host computer 10 can perform data storing appropriately with small computation load. Thereby, information gathering can be achieved with high efficiency while securing the accurate correspondence of each reply and each information gathering candidates.

Specifically, the first embodiment can perform easy-to-use and easy-to-handle information gathering by using e-mail, while achieving facilities of data arranging and data storing in a database like an internet Web. Security is high when using a data transmission and reception manner like an E-mail in which different electronic files are independently and respectively exchanged between a host system and different information gathering candidates. On the other hand, conventional internet Web questionnaire system is generally designed so that a database for storing the replies and reply requesting form are directly linked. In this case, when abnormal circumstances such as cyber-attack arise, leak of personal information including address and the like of questionnaire may occur easily. At this point, high security can be obtained in the case where information is gathered separately and respectively by using e-mail and the like.

According to the first embodiment, the keycode corresponds to "identification information" according to the first aspect of the present invention, the e-mail M corresponds to "specific data" according to the first aspect of the present invention, the reply written in the e-mail M corresponds to "reply information" according to the first aspect of the present invention, respectively.

Although the system according to the first embodiment causes the e-mail creating program 14 to create the e-mail M and leads the information gathering candidate A to write the reply in the e-mail M, the present invention is not limited to this. Other types of data exchange technology may be used. Specifically, for example, file exchange software or real-time chat program can be used by adding the identification information (that is, the keycode) to transmitted/received data in them as in the first embodiment. Furthermore, in the case where replies are gathered by an input form provided on a website, it is possible to add the keycode as in the first embodiment to exchanged data between a terminal unit and a host computer.

Although the system according to the first embodiment causes the information gathering candidate A to write the reply in the e-mail M, the present invention is not limited to this. The information gathering system according to the present invention may be made so that the system causes the information gathering candidate to attach an attachment file including the reply to the e-mail M. The information gathering system according to the present invention may also be made so that the other attachment file including a content of questions is attached to the e-mail M. In the case, a set of the electronic data including the e-mail M and the attachment file corresponds to "specific data" according to the first aspect of the present invention, the attachment file including the reply information corresponds to "reply information" according to the first aspect of the present invention, respectively.

It should be noted that an application program can be produced for executing the function of the host computer 10 and the terminal unit 50 of the information gathering system according to the first embodiment on other general system. The application program corresponds to "an information gathering program" according to the fifth aspect of the present invention.

Second Embodiment

Figure 2:
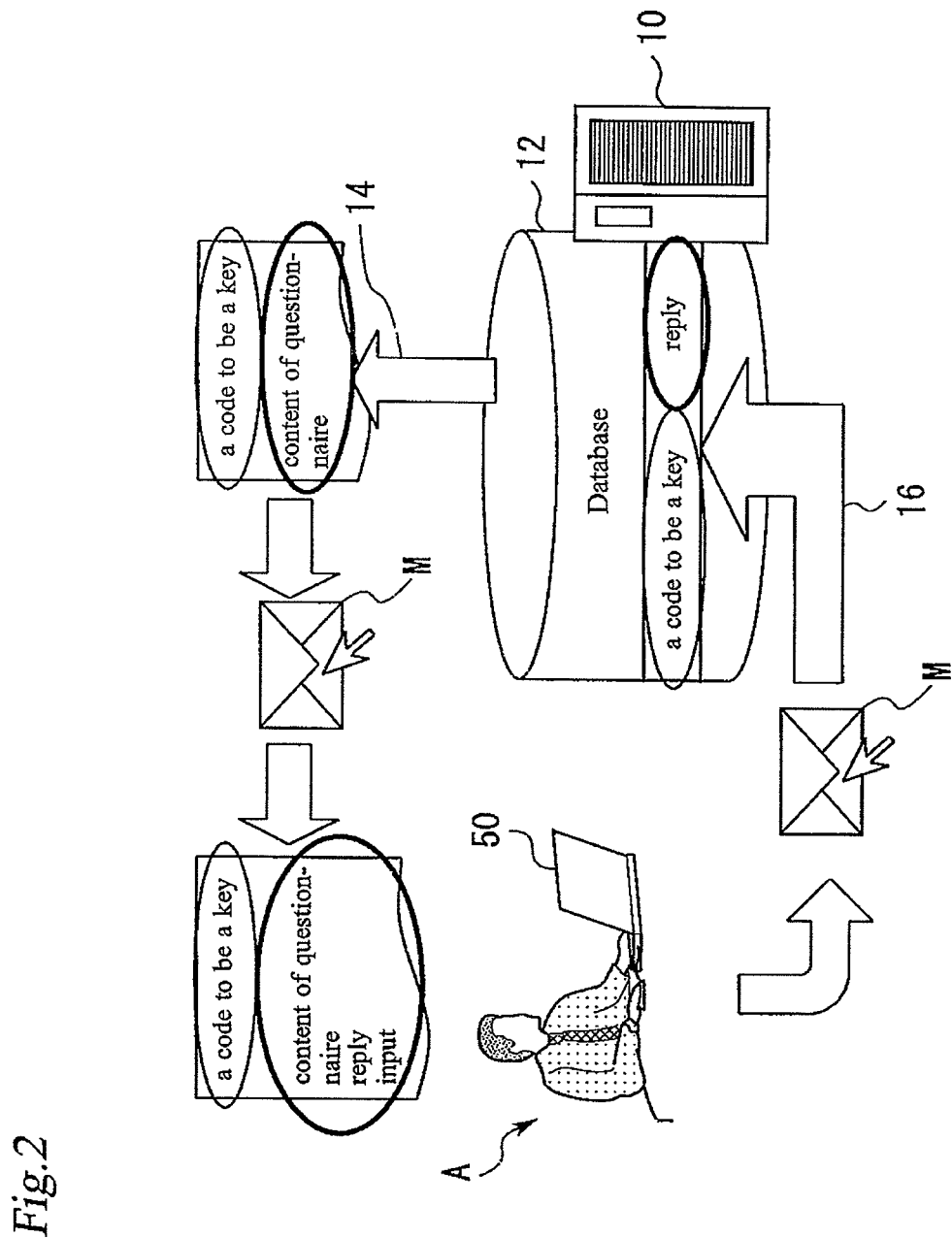
FIG. 2 is a diagram showing the configuration of an information gathering system according to the second embodiment of the present invention.

FIG. 2 is a diagram showing the configuration of an information gathering system according to a second embodiment of the present invention. In the second embodiment, questions are written in the e-mail M so that the information gathering candidates answers each question correctly. If the information gathering candidate writes the reply in plain text without any rule of input form, the form of each reply will not be unified. As a result of this, inconvenience will occur at the time of equalization processing, investigation, analysis, or reuse of the reply data. According to the second embodiment, questions are written in the e-mail M beforehand so as to avoid the inconvenient situation. Preferably, description of the questions is regulative as much as possible. It should be noted that the technique disclosed in JP H11-14385A (JP 1999-14385A) can be used when the input form is regulated.

Third Embodiment

Figure 3:
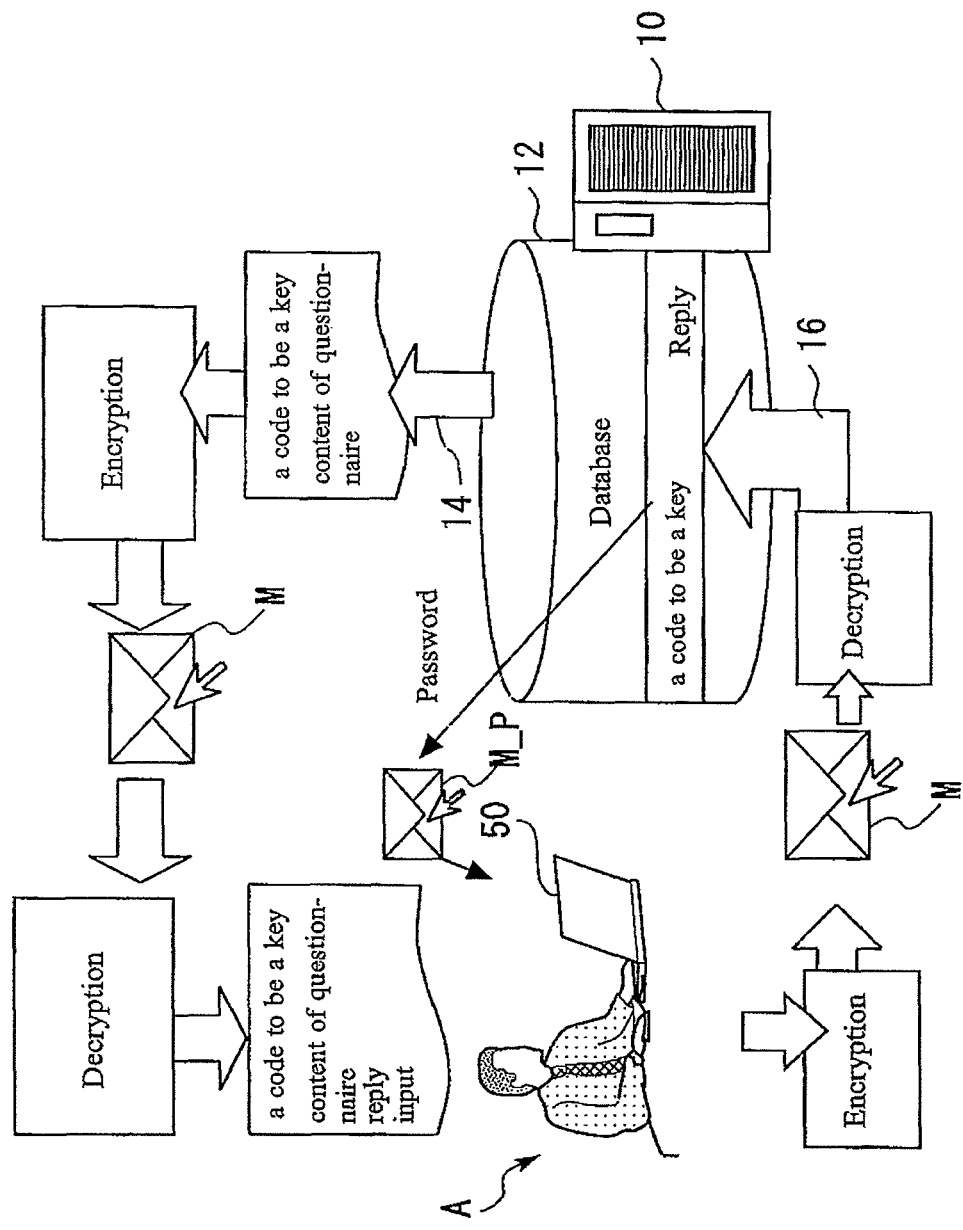
FIG. 3 is a diagram showing the configuration of an information gathering system according to the third embodiment of the present invention.

FIG. 3 is a diagram showing the configuration of an information gathering system according to a third embodiment of the present invention. In the third embodiment, the e-mail M according to the first embodiment is encrypted. That is, the host computer 10 encrypts the e-mail M and then sends it to the terminal unit 50. On the other hand, the host computer 10 separately sends e-mail M_P to the terminal unit 50. The e-mail M_P includes a password for decryption of the e-mail M.

The information gathering candidate A operates the terminal unit 50 so as to decrypt the e-mail M and write a reply in the e-mail M. After writing the reply in the e-mail M, the information gathering candidate A operates the terminal unit 50 so as to encrypt the e-mail M again and send the encrypted e-mail M to the host computer 10. When the host computer 10 receives the e-mail M, the e-mail M is decrypted, and reply information in the e-mail M is stored in predetermined data storage area by processing of the data storage program 16 as in the first embodiment. In the above described third embodiment, security of the information gathering system according to the first embodiment can be improved by the encryption of the e-mail M. It should be noted that the encryption technique can be also applied to modification of the first embodiment as well.

It should be noted that the encryption and the decryption of the e-mail M can be achieved by using application software in general use. That is, the application for encryption/decryption can be selected from several types of application software in general use. The encryption or the decryption of the e-mail M on the terminal unit 50 may be done manually by the information gathering candidate A or the operator who receives the e-mail M on the host computer 10 side.

Fourth Embodiment

Figure 4:
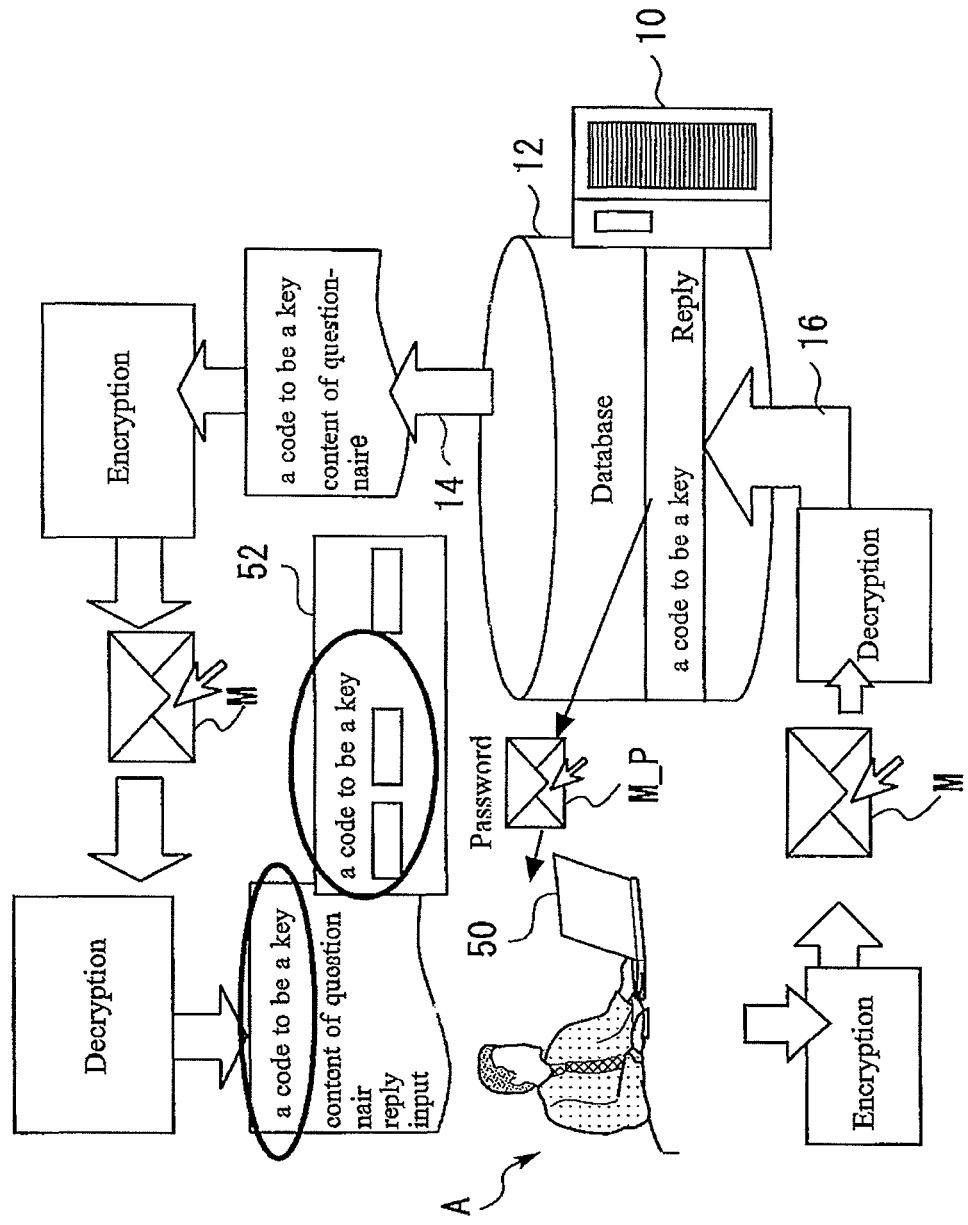
FIG. 4 is a diagram showing the configuration of an information gathering system according to the fourth embodiment of the present invention.

FIG. 4 is a diagram showing the configuration of an information gathering system according to a fourth embodiment of the present invention. The information gathering system according to the forth embodiment forbids modification of the keycode, that is the data of the keycode is protected, while a monitor 52 of the terminal unit 50 is displaying the image of reply input form after the e-mail M is opened and decrypted. The information gathering candidate A inputs the reply in the state where the modification of the keycode is being forbidden. After the information gathering candidate A completes to write a reply, the information gathering candidate A operates the terminal unit 50 so as to encrypt the e-mail M and send it to the host computer 10.

Thereby, modification of the keycode is forbidden while the e-mail M exists in the terminal unit 50 as decrypted data ("non-encrypted period"). Hence, the keycode which the e-mail M individually has can be protected while the information gathering candidate A can write the reply in the e-mail M. This makes it possible to lead the information gathering candidate A to add the reply to the e-mail M while suppressing falsification in information gathering as much as possible. As described above, the fourth embodiment makes it possible to gather information from a plurality of information gathering candidates with high efficiency, while keeping correspondence of each reply and each candidate with high reliability.

It should be noted that an application program can be produced for executing the function of the terminal unit 50 in the information gathering system according to the fourth embodiment on other general system. The application program corresponds to "a program for a terminal unit" according to the sixth aspect of the present invention, and the terminal unit 50 according to the fourth embodiment corresponds to "a terminal unit" according to the third aspect of the present invention.

Fifth Embodiment

Figure 5:
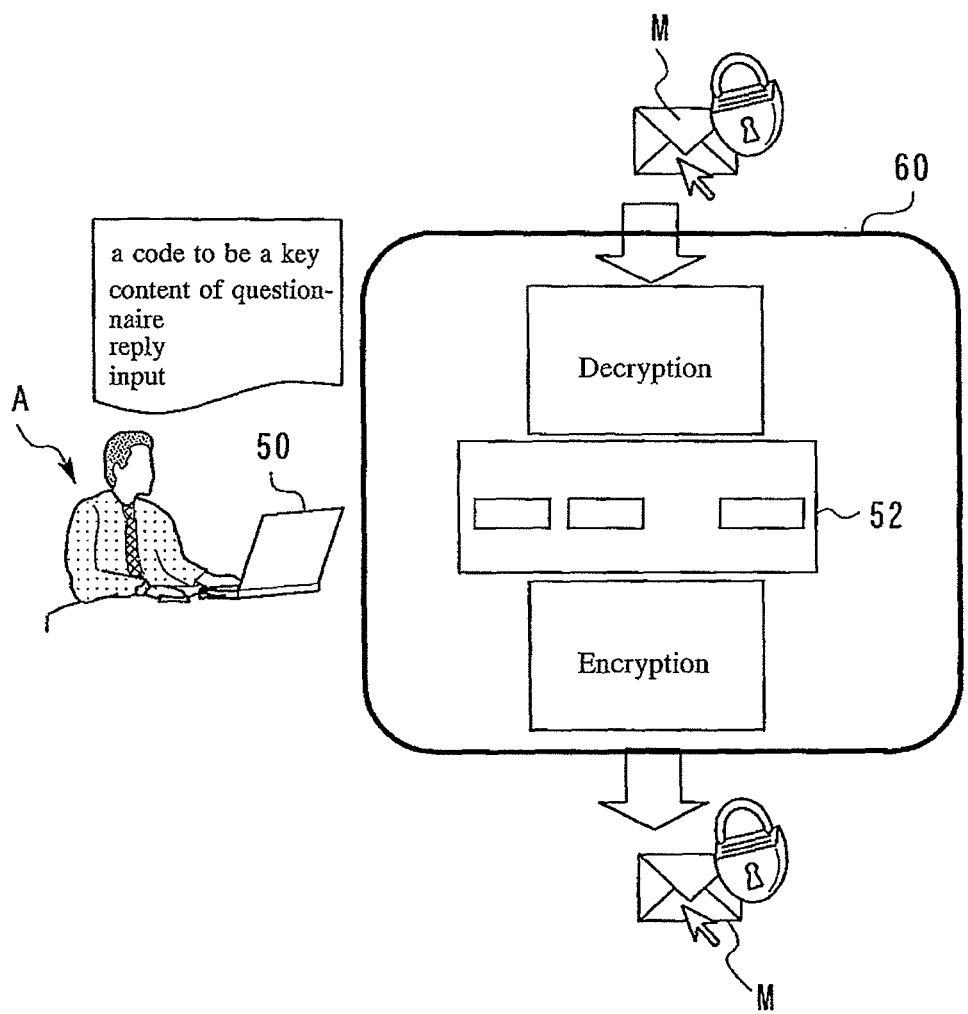
FIG. 5 is a diagram showing the configuration of an information gathering system according to the fifth embodiment of the present invention.

FIG. 5 is a diagram showing the configuration of an information gathering system according to a fifth embodiment of the present invention. In the fifth embodiment, an application 60 is installed in the terminal unit 50. The application 60 is made so that the following two functions are achieved on the terminal unit 50 when the application 60 is executed.

(i) A function, which causes the terminal unit 50 to open and display the e-mail M on the monitor 52 upon the e-mail M being decrypted. That is, the function causes the monitor 52 to display the content of the e-mail M immediately after the e-mail M is decrypted, without instruction of the operator of the terminal unit 50 to open the e-mail M.

(ii) A function, which causes the terminal unit 50 to encrypt the e-mail M whose reply requesting information is displayed on the monitor immediately after the information gathering candidate A operates the terminal unit 50 so as to close the displayed image on the monitor 52.

Thereby, in the fifth embodiment, after the e-mail M is decrypted, the function (i) can sequentially lead the information gathering candidate A to operate the terminal unit 50 so as to write the reply in the e-mail M. Further, the e-mail M can be automatically encrypted by the function (ii) when an operator operates the terminal unit 50 so as to finish its operation after the reply information is added to the e-mail M. That is, correspondence of the operator and the reply information can be surely maintained at the time when operation of the e-mail M is completed. Thus, it is possible to secure correspondence of each information gathering candidate and its reply. Thereby, the terminal unit 50 can give the operator an opportunity for operation to write the reply in the e-mail M and to close the e-mail M, and the e-mail M can be automatically encrypted except the periods when the operation are being executed. Thereby, the risk of intervention of other operations, such as falsification operation, can be reduced.

The application 60 corresponds to "a program for a terminal unit" according to the seventh aspect of the present invention, and the terminal unit 50 according to the fifth embodiment corresponds to "a terminal unit" according to the fourth aspect of the present invention. Although the terminal unit 50 according to the fifth embodiment has both of the function (i) and the function (ii) described above, however, the terminal unit 50 may have only one of the function (i) and the function (ii).

Sixth Embodiment

Figure 6:
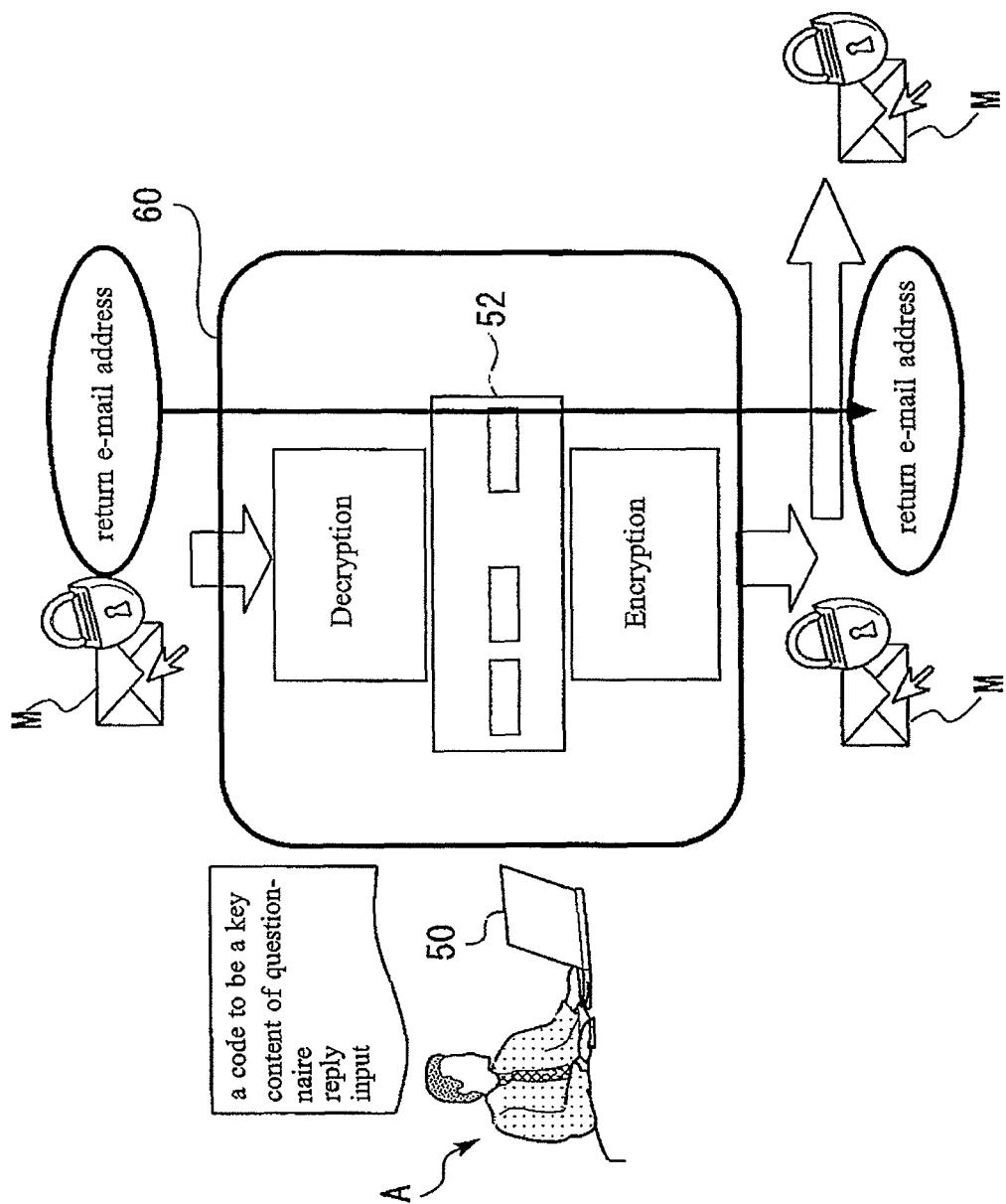
FIG. 6 is a diagram showing the configuration of an information gathering system according to the sixth embodiment of the present invention.

FIG. 6 is a diagram showing the configuration of an information gathering system according to a sixth embodiment of the present invention. In the sixth embodiment, general-purpose e-mail software is used for transmitting and receiving the e-mail M between the host computer 10 and the terminal unit 50. It may be possible to design an information gathering system so that the e-mail M is automatically send to the host computer 10 after writing of reply in the e-mail M is completed (or after writing of reply in a file attached to the e-mail M is completed). In this case, however, the e-mail M departs from the information gathering candidate A although there is no active operation of e-mail transmission by the information gathering candidate A. In this case, an occurrence of unexpected information leak is feared. According to the sixth embodiment, on the other hand, transition of the e-mail M is stopped until an e-mail sending operation is done by the information gathering candidate A, and thereby the unexpected information leak can be suppressed.

Seventh Embodiment

Figure 7:
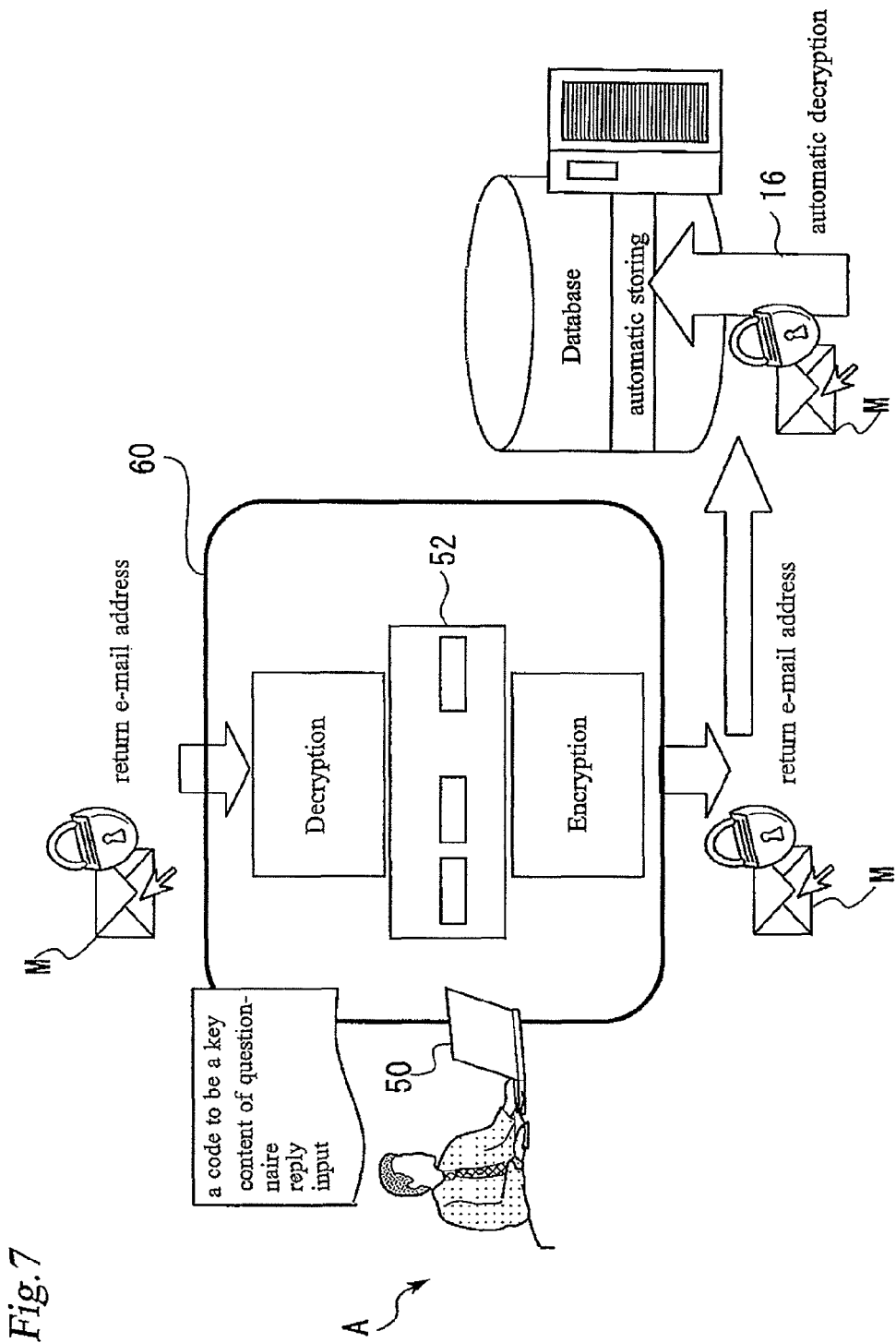
FIG. 7 is a diagram showing the configuration of an information gathering system according to the seventh embodiment of the present invention.

FIG. 7 is a diagram showing the configuration of an information gathering system according to a seventh embodiment of the present invention. In the seventh embodiment, the data storage program 16 automatically decrypts the e-mail M and automatically stores the reply in it upon the host computer 10 receiving the e-mail M. Thereby, encryption and storing process in the host computer 10 is completely automated. In the seventh embodiment, the host computer 10 also supervises a mail server that is the host computer 10 periodically accesses to a mail server. Thereby, the decryption of the e-mail M and the storing of the reply included in it can be automatically executed immediately after the e-mail M is received.

Eighth Embodiment

Figure 8:
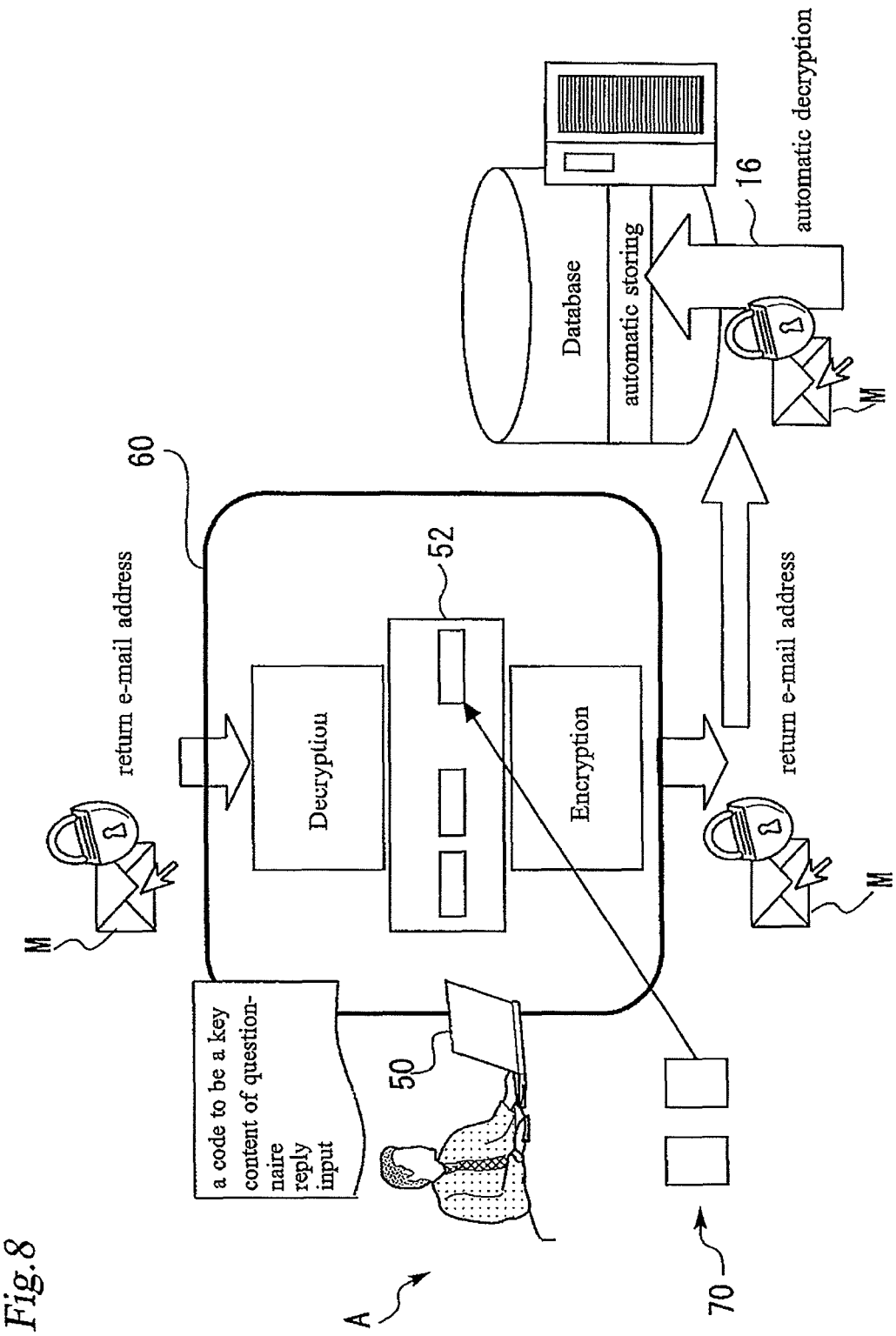
FIG. 8 is a diagram showing the configuration of an information gathering system according to the eighth embodiment of the present invention.

FIG. 8 is a diagram showing the configuration of an information gathering system according to an eighth embodiment of the present invention. In the eighth embodiment, information gathering can be achieved by leading information gathering candidates to attach their reply to the e-mail M as attached data. Further, the application 60 according to the eighth embodiment integrally encrypts the set of the e-mail M and the attached data.

In the eighth embodiment, the application 60 decrypts received e-mail M. When the decryption is completed, a dialog image to request an attachment data 70 is displayed on the monitor 52. For example, the dialog image includes an input box to request an address of the attachment data 70 in the terminal unit 50, and the information gathering candidate A types the address of the attachment data 70 in the input box, then attachment operation of the attachment data 70 to the e-mail M is completed. After that, the information gathering candidate A closes the reply-requesting dialog image, the terminal unit 50 encrypts the e-mail M and the attachment data 70 so that they become one integrated datum. Next, the encrypted e-mail M is returned to the host computer 10.

The host computer 10 receives the e-mail M, decrypts it, and stores the attachment data 70 into one of data storage areas of the database 12 whose memory address corresponds to a memory address associated with the keycode of the e-mail M. The attachment data 70 may be a general electronic file (for example, a file of text editor on the market, a file of spreadsheet program on the market or the like) or a specialized electronic file for particular-information-gathering purpose.

According to the eighth embodiment, the terminal unit 50 integrally (undividablly) encrypts the e-mail M and the attachment data 70. When the operator of the terminal unit 50 closes the e-mail M after attachment operation of the attachment data, the e-mail M and the attachment data 70 are integrally encrypted so as to create encrypted e-mail M, and then preparation for sending process of the e-mail M is completed. Thereby, correspondence of the attachment data 70 and its keycode can be surely conserved, and this enables to maintain correspondence of the information gathering candidate A and the reply.

It should be noted that the integral encryption means not only an encryption technique of creating an encrypted data as one electronic file. The integral encryption may also means an encryption technique of creating the encrypted data as a plurality of electronic files by using, for example, file division and uniting software. File division technique is a known art, in which a plurality of electronic files are created by dividing one large size electronic file and the electronic files are exchanged. This technique may be used as the integral encryption according to present invention. The attachment data 70 corresponds to "reply information" according to the first aspect.

Ninth Embodiment

Figure 9:
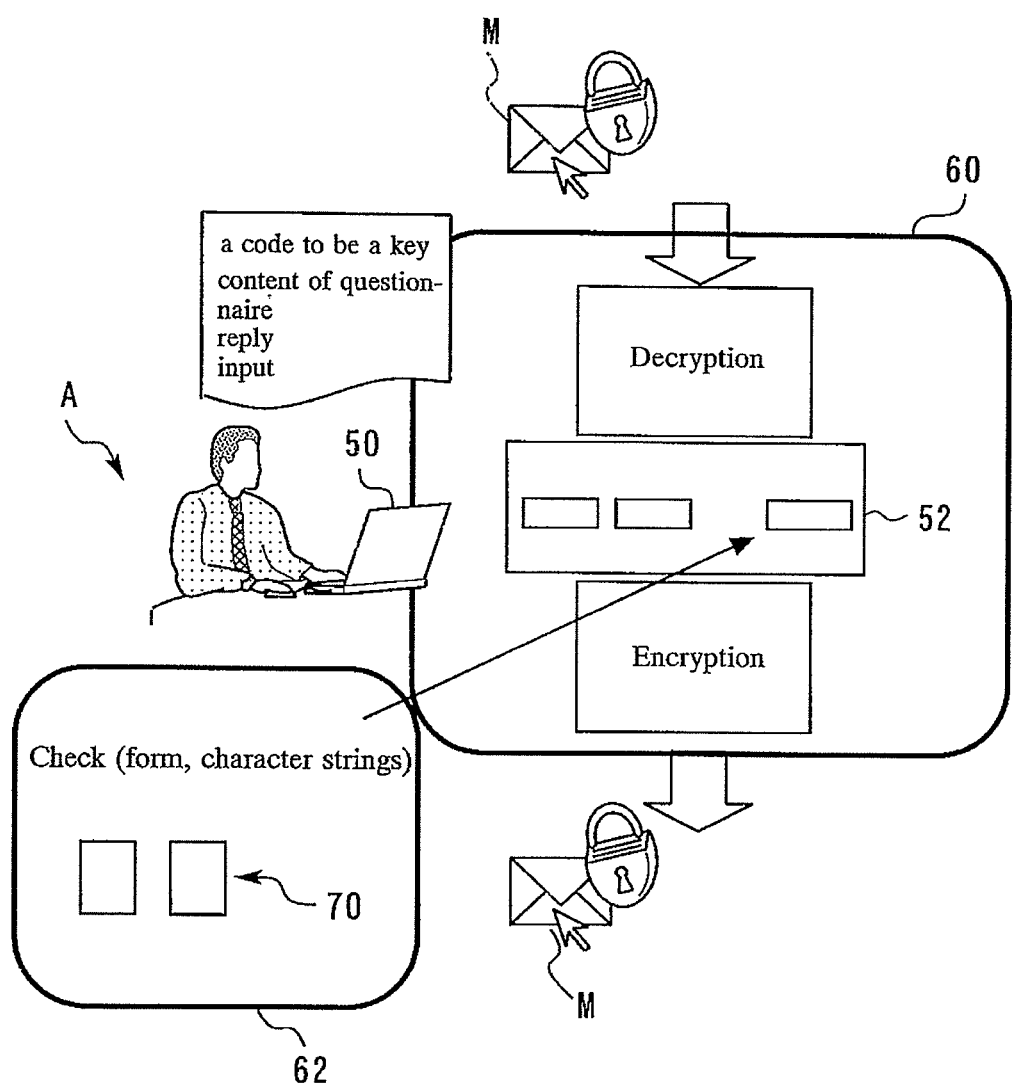
FIG. 9 is a diagram showing the configuration of an information gathering system according to the ninth embodiment of the present invention.
Figure 10:
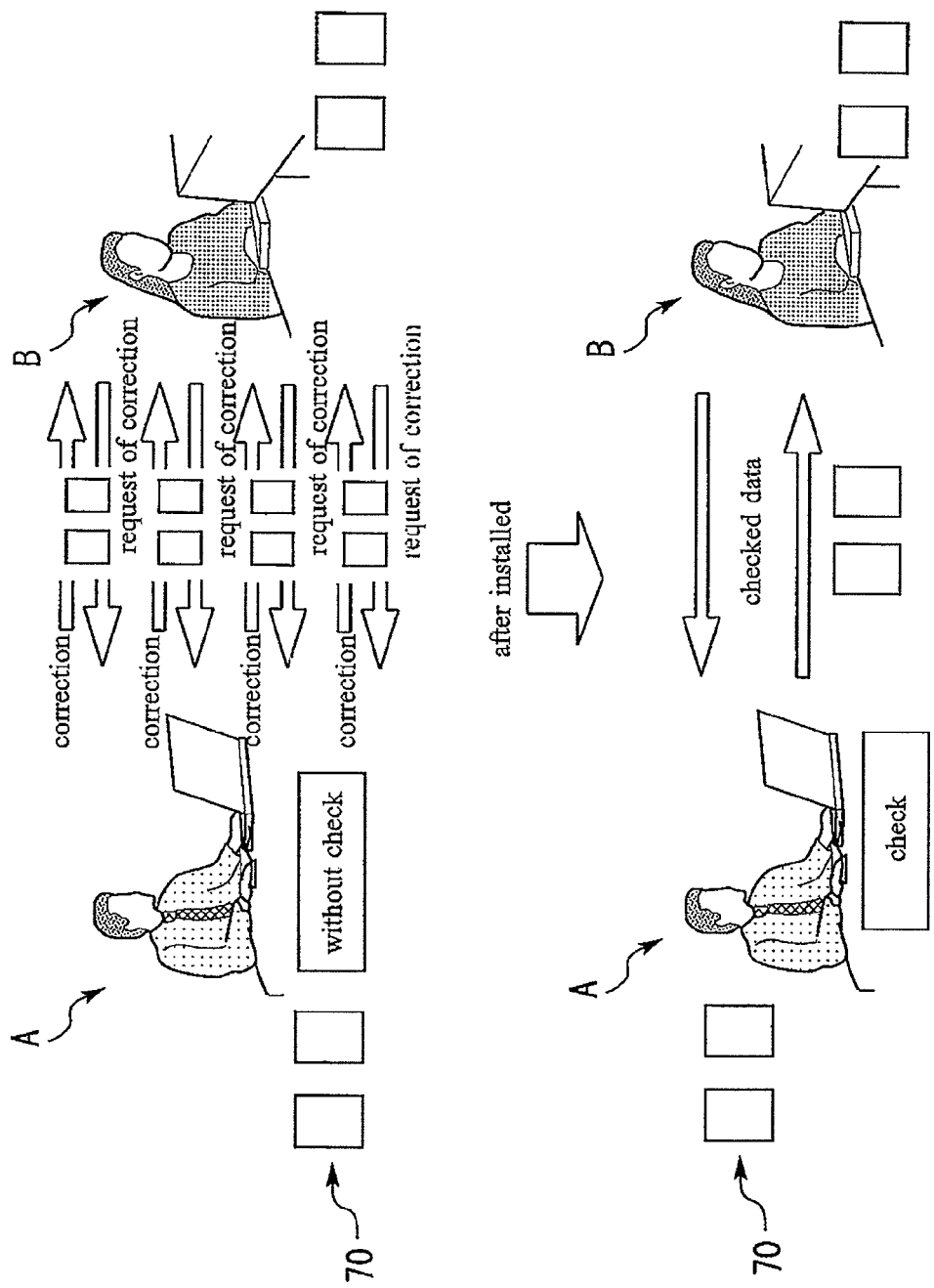
FIG. 10 is a diagram showing the configuration of an information gathering system according to the ninth embodiment of the present invention.

FIG. 9 is a diagram showing the configuration of an information gathering system according to a ninth embodiment of the present invention. In the ninth embodiment, the information gathering system checks whether a form of the reply matches a prescribed form. Specifically, in the ninth embodiment, the application 60 includes a routine 62 for a format check of the attachment data 70 and a character string check in the attachment data 70, as shown in FIG. 9. Thereby, the attachment data 70 which sent to the host computer 10 can be always written in accordance with the prescribed form and includes appropriate character strings. FIG. 10 is a diagram for describing an advantage of the information gathering system according to the ninth embodiment. If check function is not provided as in the upper side of FIG. 10, data exchange may be repeated between the information gathering candidate A and survey conductor B. In the ninth embodiment, on the other hand, check function is provided as shown in the lower side of FIG. 10, thereby it is possible to receive a reply in appropriate form by one data exchange.

Tenth Embodiment

Figure 11:
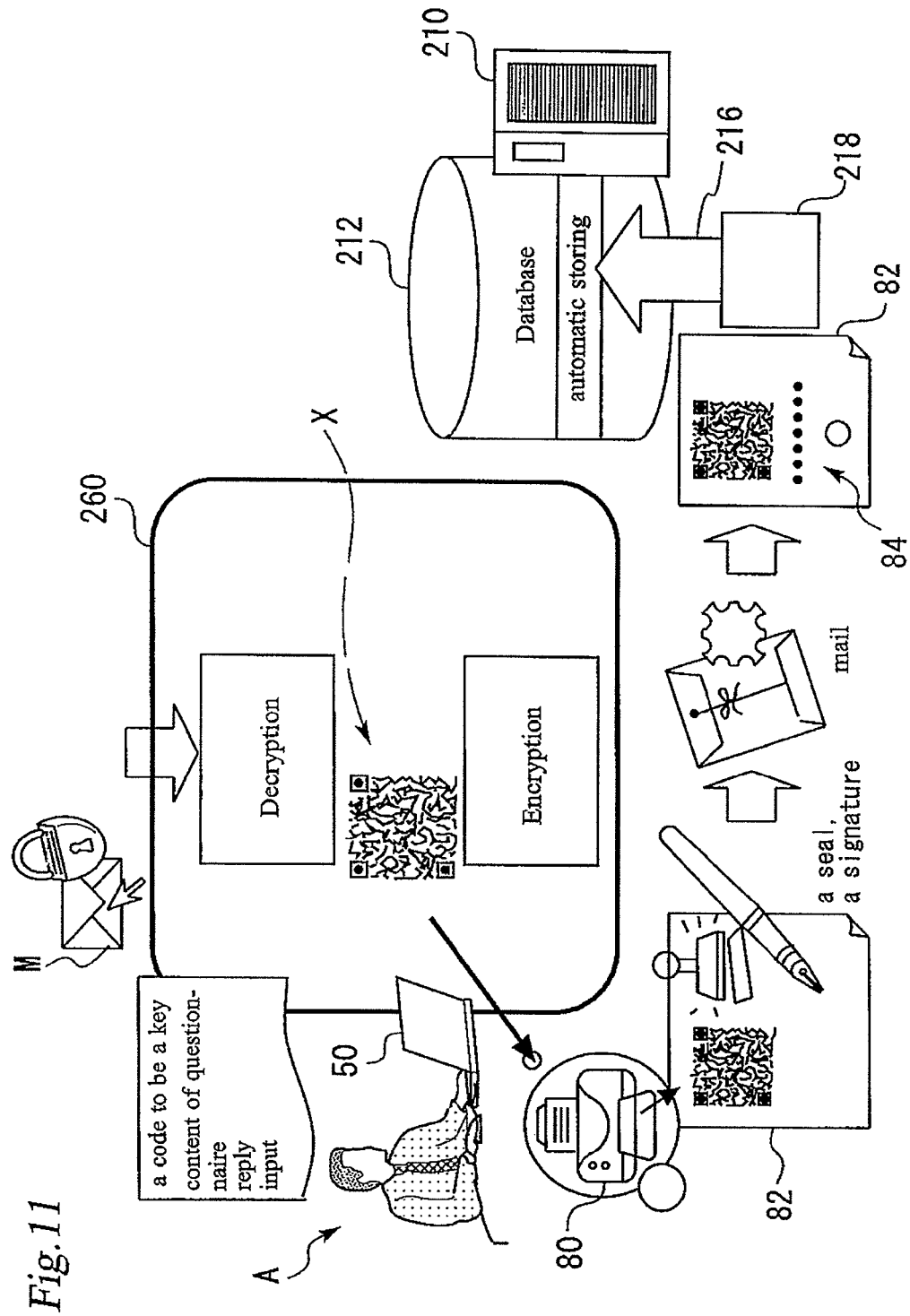
FIG. 11 is a diagram showing the configuration of an information gathering system according to the tenth embodiment of the present invention.

FIG. 11 is a diagram showing the configuration of an information gathering system according to a tenth embodiment of the present invention. For example, when a guarantee or a certain certificates is gathered, those documents may need seal or a signature on law. By a procedure only using electronic data, information gathering in such a case is not easy, so the procedure using physical information media, such as paper, is necessarily used in such a case. In tenth embodiment, the following technique is used for the purpose of collecting replies efficiently even in cases where the information to be gathered includes particular information that is not easy to collect as digital data, such as seal, a signature and etc.

As shown in FIG. 11, the information gathering system according to the tenth embodiment includes a host computer 210 that has a database 212. The host computer 210 is designed so that the encrypted e-mail M having a keycode can be sent to the terminal unit 50 from the host computer 210, as in the host computer 10. In the tenth embodiment, information data of two-dimensional bar-code X is added to the e-mail M as a keycode (for example, the digital data of the two-dimensional bar-code X is added to the e-mail M as an attachment data).

In the tenth embodiment, an application 260 is installed in the terminal unit 50. The application 260 decrypts the e-mail M and opens the data of the two-dimensional bar-code X on the terminal unit 50 in a state where the two-dimensional bar-code X can be printed out (for example, in a state where data of the two-dimensional bar-code X is opened in generalized text editor or the like). Thereby, the information gathering candidate A can cause a printer 80 connecting to the terminal unit 50 to print out a document 82 on which the two-dimensional bar-code X is printed. In the tenth embodiment, the information gathering candidate A writes the reply on the document 82, and then the information gathering candidate A put a signature or a seal on the document 82. Thereafter, the information gathering candidate A mails the document 82 to the location of the host computer 210.

The host computer 210 is in connection with a scanner 218. The scanner 218 can read the two-dimensional bar-code X. In addition, the scanner 218 can read information 84 written in the predetermined position of the document 82 so as to convert the information 84 into electronic data. A scanner that can automatically read a plurality of sheets of paper may be preferably used as the scanner 218.

Depending on purpose or use of the document 82, the information 84 includes various contents. In the case where a seal or a signature is the information to be gathered, the signature written in the document 82 is scanned. In the case where the document to be gathered is a guarantee or a certificate, on the other hand, a seal or the like and identification number of the gathered document are scanned. In the case of gathering questionnaires, the replies in the questionnaires are scanned.

The host computer 210 includes a data storing program 216. The data storing program 216 recognizes the information of the two-dimensional bar-code X, which the scanner 218 read, as a keycode. Thereafter, the data storing program 216 identifies a particular memory address of the database 212 in accordance with the keycode. The data storing program 216 stores the electronic data of the information 84 into one of the data storage areas of the database 212 in accordance with the memory address identified on the basis of the keycode.

As described above, the information gathering system according to the tenth embodiment can perform information gathering with high efficiency even if non digital data such as a signature or a seal is included in the information to be gathered.

In the tenth embodiment, the two-dimensional bar-code X which serves as a keycode is printed on the document 82. If an easy-decodable code is used as a keycode, forgery of the keycode or the reliability fall of reply information may occur. However, it is relatively difficult for humans to read two-dimensional bar-code. Thereby, the information gathering system according to the tenth embodiment can gather a reply with high efficiency while suppressing the forgery of the keycode and the reliability fall of reply information.

Although not shown, in the tenth embodiment, a decryption password for decrypting the e-mail M and a decoding password for decoding the two-dimensional bar-code X are created. The decryption password is sent to the terminal unit 50. On the other hand, it is desirable that the decoding password is stored and kept in secret in the host computer 210. Thereby, forgery of the keycode can be suppressed.

It should be noted that there is no limitation in particular in the size of the document 82. Small paper media, such as a postcard, may be used. The material of the document 82 is not limited to paper. The reason is that it is possible to use at least an object which has a flat shape and be made of a material which can be put a sign or a seal thereon as a substitution of the document 82. In the tenth embodiment, the document 82 corresponds to "information printed material" according to the second aspect.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2009-031140, filed on Feb. 13, 2009 including specification, claims, drawings and summary, on which the Convention priority of the present application is based, are incorporated herein by reference in its entirety.

What is claimed is:

1. An information gathering system comprising:
a host unit in communication with a network and including a memory unit, the memory unit having a plurality of data storage areas, each of the data storage areas being respectively associated with one of a plurality of memory addresses; and
a terminal unit in communication with the network, wherein
the host unit
creates e-mail having an attached file including reply requesting information and one or more sorts of identification information, wherein
the identification information is associated with one of the plurality of memory addresses in accordance with a predetermined correspondence rule, and
the reply requesting information is information for requesting reply information from an information gathering candidate,
encrypts at least the reply requesting information, and
sends the e-mail having the attached file with the reply requesting information that has been encrypted to the network;
the terminal unit
receives the e-mail including the attached file with the reply requesting information that has been encrypted from the network,
decrypts the e-mail including the attached file with the reply requesting information that has been encrypted,
displays the reply requesting information on the terminal unit in a state in which the reply information can be added to the attached file,
encrypts at least the reply information of the attached file that is displayed on the monitor of the terminal unit upon receiving a command to close display of the reply requesting information to which the reply information has been added, immediately after closing display of the reply requesting information; and
sends the e-mail with the attached file including the reply information that has been encrypted to the network; and
the host unit
receives the e-mail having the attached file including the reply information that has been encrypted from the network, and
decrypts and stores the reply information included in the attached file that is received by the host unit in one of the data storage areas so that a memory address of the one of the data storage areas corresponds to a memory address associated with the identification information of the e-mail that is received by the host unit.

2. The information gathering system according to claim 1, wherein modification of the identification information is forbidden on the terminal unit at least in a period extending from a time at which the e-mail having the attached file with the reply requesting information is decrypted by the terminal unit to a time at which at least the reply requesting information is encrypted by the terminal unit.

3. The information gathering system according to claim 2, wherein
the terminal unit displays the reply requesting information that has been decrypted on a monitor of the terminal unit; and
the terminal unit encrypts at least the reply information that is displayed on a monitor of the terminal unit upon receiving a command to close display of the reply requesting information to which the reply information has been added.

4. The information gathering system according to claim 1, wherein the terminal unit displays the reply requesting information of the attached file, after decrypting at least the reply requesting information, without instruction of an operator of the terminal unit to open the e-mail having the attached file.

5. The information gathering system according to claim 4, wherein
in encrypting the reply information, the terminal unit creates an encrypted datum or a set of encrypted data,
the terminal unit sends the encrypted datum or the set of the encrypted data to the network as encrypted e-mail,
the host unit decrypts the encrypted datum or the set of the encrypted data and distinguishes content of the reply information from content of the e-mail, and
the host unit stores the reply information in one of the data storage areas having a memory address that corresponds to the identification information of the e-mail.

6. The information gathering system according to claim 1, wherein
in encrypting the reply information, the terminal unit creates an encrypted datum or a set of encrypted data,
the terminal unit sends the encrypted datum or the set of the encrypted data to the network as encrypted e-mail,
the host unit decrypts the encrypted datum or the set of the encrypted data and distinguishes content of the reply information from content of the e-mail, and
the host unit stores the reply information in one of the data storage areas having a memory address that corresponds to the identification information of the e-mail.

\* \* \* \* \*